(12) United States Patent
Russell

(10) Patent No.: US 8,632,308 B2
(45) Date of Patent: Jan. 21, 2014

(54) FLUID ELASTOMERIC DAMPER ASSEMBLY INCLUDING INTERNAL PUMPING MECHANISM AND VOLUME COMPENSATOR

(75) Inventor: Donald D. Russell, Fairview, PA (US)

(73) Assignee: Lord Corporation, Cary, NC (US)

( * ) Notice: Subject to any disclaimer, the term of this patent is extended or adjusted under 35 U.S.C. 154(b) by 909 days.

(21) Appl. No.: 12/625,886

(22) Filed: Nov. 25, 2009

(65) Prior Publication Data
US 2010/0247288 A1     Sep. 30, 2010

Related U.S. Application Data

(60) Provisional application No. 61/118,004, filed on Nov. 26, 2008.

(51) Int. Cl.
*B64C 27/32*     (2006.01)

(52) U.S. Cl.
USPC .......................................... 416/145; 416/500

(58) Field of Classification Search
USPC .............. 416/51, 52, 144, 145, 500; 188/316, 188/318, 378, 379
See application file for complete search history.

(56) References Cited

U.S. PATENT DOCUMENTS

| | | | | |
|---|---|---|---|---|
| 2,616,510 A | * | 11/1952 | Rzeczycki | 416/100 |
| 3,361,216 A | * | 1/1968 | Walker | 416/26 |
| 4,105,365 A | * | 8/1978 | Ferris et al. | 416/107 |
| 5,219,430 A | * | 6/1993 | Antoine | 267/140.12 |
| 5,501,434 A | | 3/1996 | McGuire | |
| 6,092,795 A | | 7/2000 | McGuire | |
| 6,454,206 B2 | * | 9/2002 | Vincent | 244/17.27 |

\* cited by examiner

*Primary Examiner* — Dwayne J White
(74) *Attorney, Agent, or Firm* — Richard G. Miller

(57) ABSTRACT

Rotary wing system with a rotating blade rotating about a rotation axis. The system includes a fluid damper with a damper fluid for controlling a troublesome motion. The fluid damper has an inboard end and an outboard end, the damper inboard end attached to a first rotary wing system inboard member proximate the rotation axis and the outboard end attached to a second rotary wing system outboard member distal from the rotation axis. The fluid damper contains a damper fluid volume in at least a first working chamber which is worked by a relative motion between said first rotary wing system inboard member and said second rotary wing system outboard member to control the troublesome motion. The damper includes a volume compensator channel in fluid communication with the damper fluid, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the at least first working chamber.

20 Claims, 9 Drawing Sheets

FLUID ELASTOMERIC DAMPER ASSEMBLY INCLUDING INTERNAL PUMPING MECHANISM AND VOLUME COMPENSATOR

CROSS REFERENCE

This application claims the benefit of, and incorporates by reference, U.S. provisional patent application No. 61/118,004 filed on Nov. 26, 2008.

FIELD OF THE INVENTION

The invention relates to the field of rotary wing systems with working fluids and volume compensators. The invention relates to the field of controlling rotating blades with troublesome motion. More particularly the invention relates to the field of aircraft rotary wing blade dampers with working fluids and volume compensators for rotary wing fluid dampers.

SUMMARY OF THE INVENTION

In an embodiment the invention includes a rotary wing system with at least one rotating blade rotating about a rotation axis. The rotary wing system having a troublesome motion when rotating about the rotation axis, the system including a fluid damper with a damper fluid for controlling the troublesome motion. The fluid damper having an inboard end and an outboard end, preferably with the fluid damper inboard end attached to a first rotary wing system inboard member proximate the rotation axis and the outboard end attached to a second rotary wing system outboard member distal from the rotation axis. The fluid damper contains a damper fluid volume in at least a first working chamber which is worked by a relative motion between the first rotary wing system inboard member and the second rotary wing system outboard member to control the troublesome motion, the fluid damper including a volume compensator channel in fluid communication with the damper fluid, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the at least first working chamber.

In an embodiment the invention includes a method for controlling a rotating blade, the method comprising: providing a rotating blade which rotates about a rotation axis. The method includes providing a fluid damper with a damper fluid and at least a first working chamber for controlling a motion of the rotating blade. The method includes providing a volume compensator with a volume compensator channel in fluid communication with the damper fluid, the volume compensator channel including a centrifugal force mass member movable along a volume compensating length of the volume compensating channel. The method includes linking the fluid damper and the volume compensator with the rotating blade wherein a rotation about the rotation axis forces the centrifugal force mass member towards an outboard end of the volume compensating channel and pushes damper fluid from the volume compensator channel towards the at least first working chamber.

In an embodiment the invention includes a rotating blade damper for a blade rotating about a rotation axis, the blade damper including a fluid damper with a damper fluid for controlling a troublesome blade motion. The fluid damper having an inboard end and an outboard end, the fluid damper inboard end for attachment to a first inboard member and the outboard end for attachment to a second outboard member, the fluid damper containing a damper fluid volume in at least a first working chamber which is worked by a relative motion between the inboard end and the outboard end to control the troublesome motion. The damper including a volume compensator channel in fluid communication with the damper fluid, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the at least first working chamber.

In an embodiment the invention includes a method of making a damper. The method including providing a damper fluid. The method including providing a housing for containing the damper fluid in at least a first working chamber and at least a second working chamber. The method including providing a volume compensator with a volume compensator channel in fluid communication with the damper fluid, the volume compensator channel including a centrifugal force mass member movable along a volume compensating length having an inboard end and an outboard end, wherein a rotation of the volume compensator with the volume compensating length outboard end outboard of the volume compensating length inboard end forces the centrifugal force mass member towards the outboard end of the volume compensating channel and applies a pressure to the damper fluid.

In an embodiment the invention includes a method of making a rotating blade machine. The method comprises providing a rotating blade rotor which rotates about an axis of rotation, the rotating blade rotor including a fluid member, the fluid member including a housing containing a working fluid. The method includes providing a volume compensator with a volume compensator channel in fluid communication with the working fluid, the volume compensator channel including a centrifugal force mass member movable along a volume compensating length having an inboard end proximate the axis of rotation and an outboard end distal from the axis of rotation, wherein a rotation of the volume compensator with the rotating blade rotor forces the centrifugal force mass member towards the outboard end of the volume compensating channel and applies a pressure to the working fluid.

In an embodiment the invention includes a method of making a rotary wing aircraft machine, the method comprises providing a rotary wing rotor which rotates about an axis of rotation, the rotary wing rotor including a fluid member, the fluid member including a housing containing a working fluid. The method includes providing a volume compensator in fluid communication with the working fluid, the volume compensator including a movable centrifugal force mass member, wherein a rotation of the volume compensator with the rotary wing rotor forces the centrifugal force mass member to apply a pressure to the working fluid.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE PREFERRED EMBODIMENT

Figure 2:
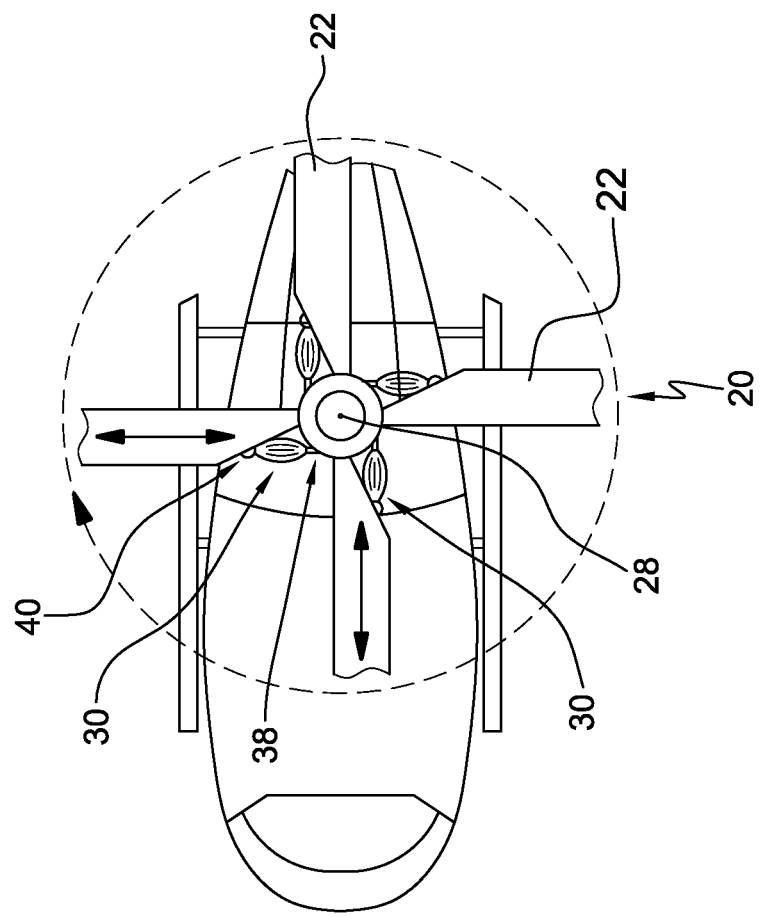
FIGS. 1-2 illustrate a rotary wing system on rotary wing aircraft.
Figure 1:
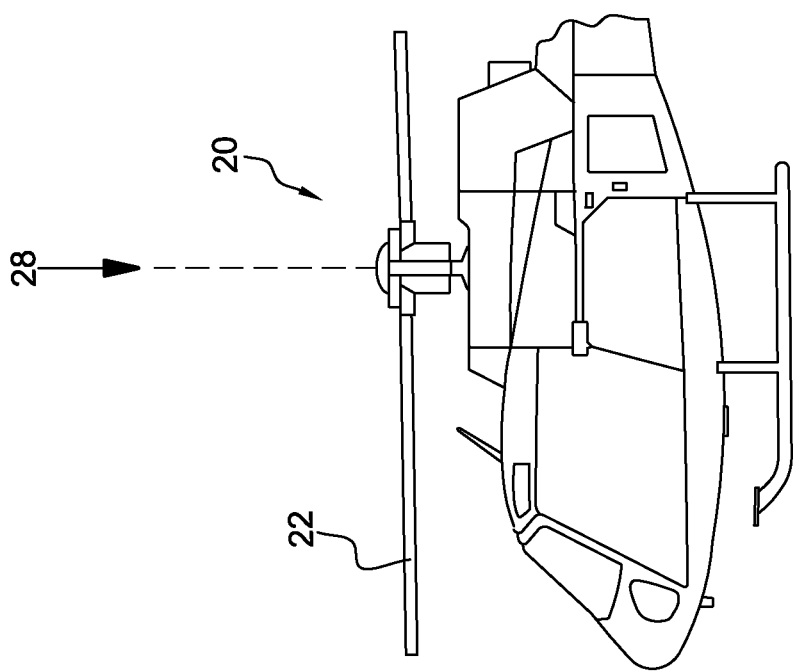
Figure 3:
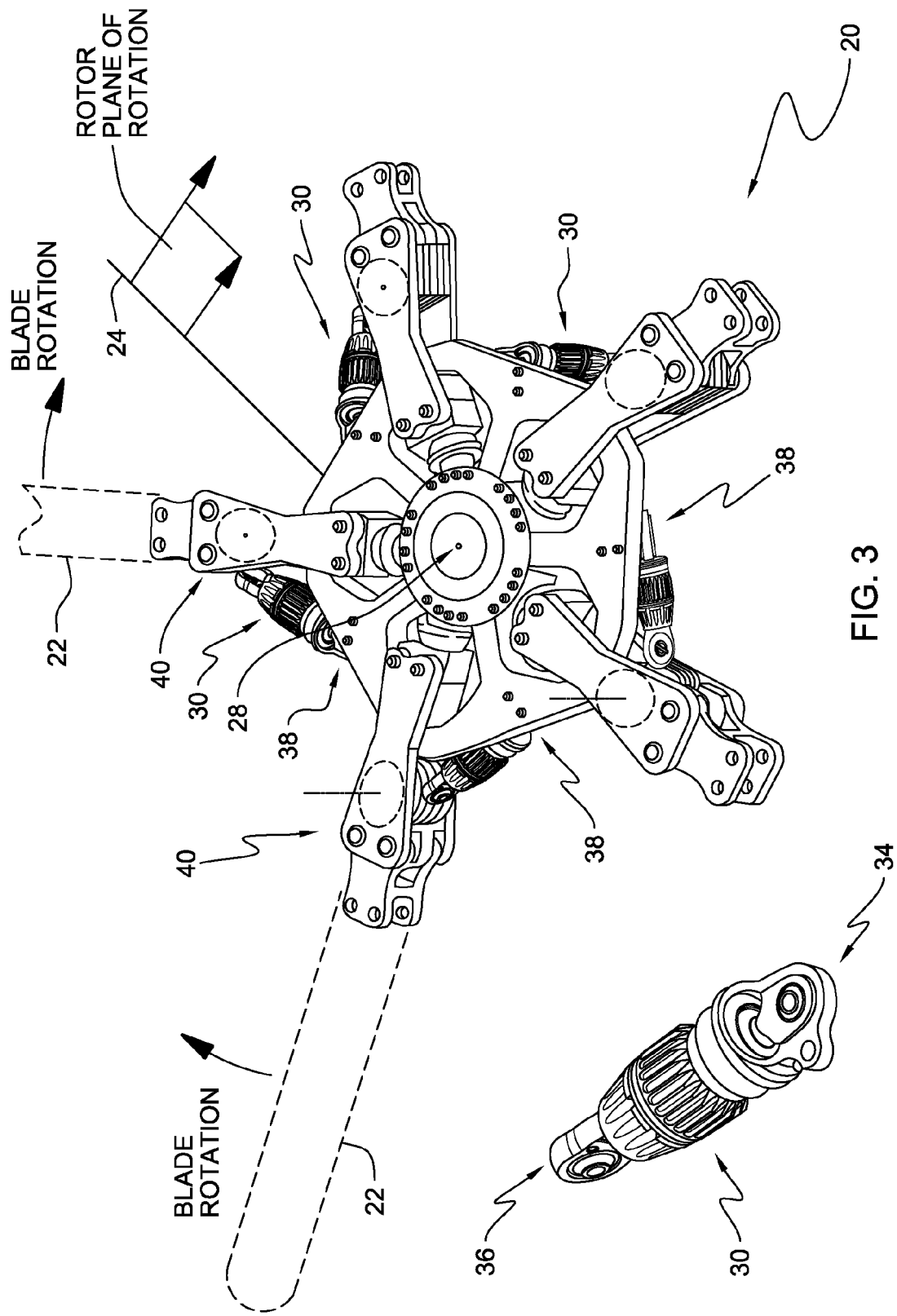
FIG. 3 illustrates a rotary wing system with rotating blade dampers.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a rotary wing system 20 with at least one rotating blade 22 rotating about a rotation axis 28, preferably in a rotor plane of rotation. The rotary wing system having a troublesome motion when rotating about the rotation axis at least at a rotation operation frequency, the system including a fluid damper 30 with a damper fluid 32 for controlling the troublesome motion. The fluid damper 30 having an inboard end 34 and an outboard end 36, the fluid damper inboard end for attachment to a first rotary wing system inboard member 38 proximate the rotation axis 28 and the outboard end for attachment to a second rotary wing system outboard member 40 distal from the rotation axis 28. The fluid damper 30 containing a damper fluid volume in at least a first working chamber 42 which is worked by a relative motion between the first rotary wing system inboard member and the second rotary wing system outboard member to control the troublesome motion. Preferably the at least first working chamber 42 is an inboard chamber and the damper includes an adjacent second working chamber 44, preferably an outboard chamber. Preferably the first working chamber 42 is adjacent an inboard outer fluid-elastomeric end chamber 46 and the second working chamber 44 is adjacent an outboard outer fluid-elastomeric end chamber 48. The fluid damper preferably includes a volume compensator channel 50 in fluid communication with the damper fluid through fluid conduits which eventually communicate with the damper fluid volume in the working chambers. The volume compensator channel includes a centrifugal force mass member 52 movable along a volume compensating length. The volume compensator centrifugal force mass member is preferably a solid dense mass member, prefer comprised of a high density material and with a specific gravity greater than the specific gravity of the damping fluid. The volume compensator channel volume compensating length has an inboard end and an outboard end and a volume compensator channel axis 54. The volume compensator centrifugal force mass member 52 is movable along a volume compensating length of the volume compensating channel wherein a rotation about the rotation axis 28 forces the centrifugal force mass member 52 towards an outboard end of the volume compensating channel and pushes damper fluid from the volume compensator channel towards the working chambers 42 and 44.

Preferably the centrifugal force mass member 52 is comprised of a solid core 56, preferably a solid metal core. Preferably the solid metal core is a solid dense metal, preferably a high density metal material with a centrifugal force mass member specific gravity greater than the specific gravity of the damping fluid. Preferably the centrifugal force mass member 52 is comprised of a cylindrical slider with a first inboard larger OD and a second outboard smaller OD, with the second outboard OD for reception in an outboard channel receiver volume compensating length terminating outboard end 58. Preferably the centrifugal force mass member specific gravity is greater than the specific gravity of the damping fluid. Preferably the centrifugal force mass member 52 has a pressurizing weight sufficient to pressurize the fluid when rotating at an operation rotation frequency. Preferably the centrifugal force mass member 52 is comprised of an exterior sliding shell 60. Preferably the centrifugal force mass member exterior sliding shell 60 has a nominal friction coefficient f<0.25, preferably nominal friction coefficient f<0.1. Preferably the centrifugal force mass member exterior sliding shell 60 is comprised of a polymer, preferably a low friction smooth plastic coating encasing the solid metal core. Preferably the centrifugal force mass member 52 includes a fluid seal member 62, preferably an encircling circumference dynamic sliding elastomeric seal ring, preferably the circumference of the mass member 52 and volume compensator channel bore 50 is lubricated with the damping fluid 32, preferably with some fluid intentionally disposed in the gas filled non-fluid inboard side (the nitrogen charged side of the centrifugal force mass) to reduce the friction of the sliding seal 62. Preferably the centrifugal force mass member 52 is void free.

As the rotation about the rotation axis 28 forces the centrifugal force mass member 52 towards the outboard end 58 of the volume compensating channel 50 a channel gas 64 fills the inboard void space in the volume compensating channel left behind the moving centrifugal force mass member. Preferably the inboard void space in the volume compensating channel left behind the moving centrifugal force mass member includes a small amount of disposed lubricating damper fluid. In a preferred embodiment the channel gas 64 is an expanding sealed channel gas, preferably having a low pressure charge applied, preferably less than 2, preferably less than 1.5, more preferably less than 1.25, more preferably less than 1.1 atmosphere, and most preferably about one atmosphere at room temperature or operating temperature, preferably comprised of nitrogen to provide the nitrogen charged side of the centrifugal force mass. Preferably the low pressure charge is applied wherein the low pressure inhibits the gas pressure charge from urging the centrifugal force mass member towards the outboard end at rest (no rotation). In an embodiment the channel gas 64 is a filtered treaded atmospheric channel gas.

Figure 4A:
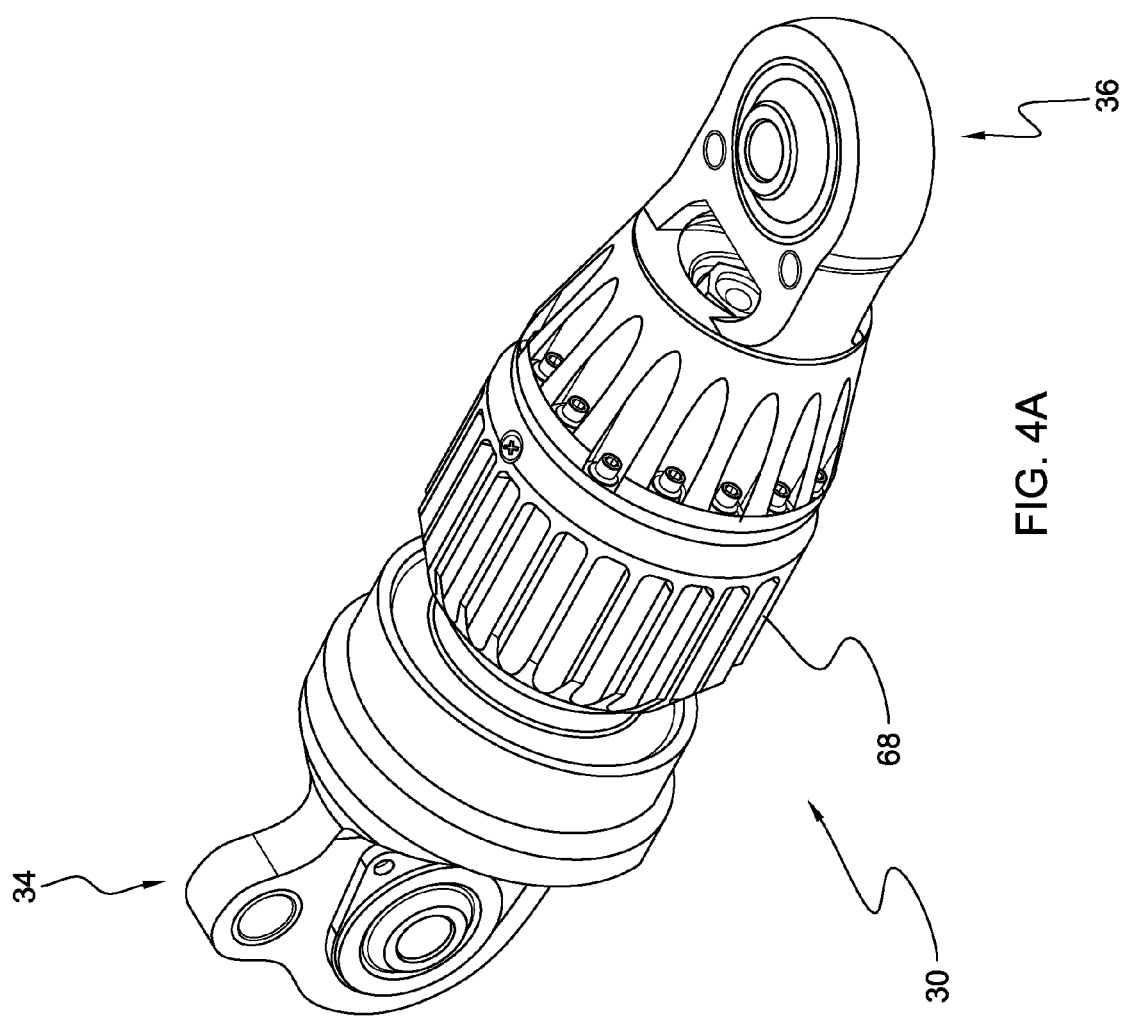
FIGS. 4A-G illustrate rotating blade dampers.
Figure 4B:
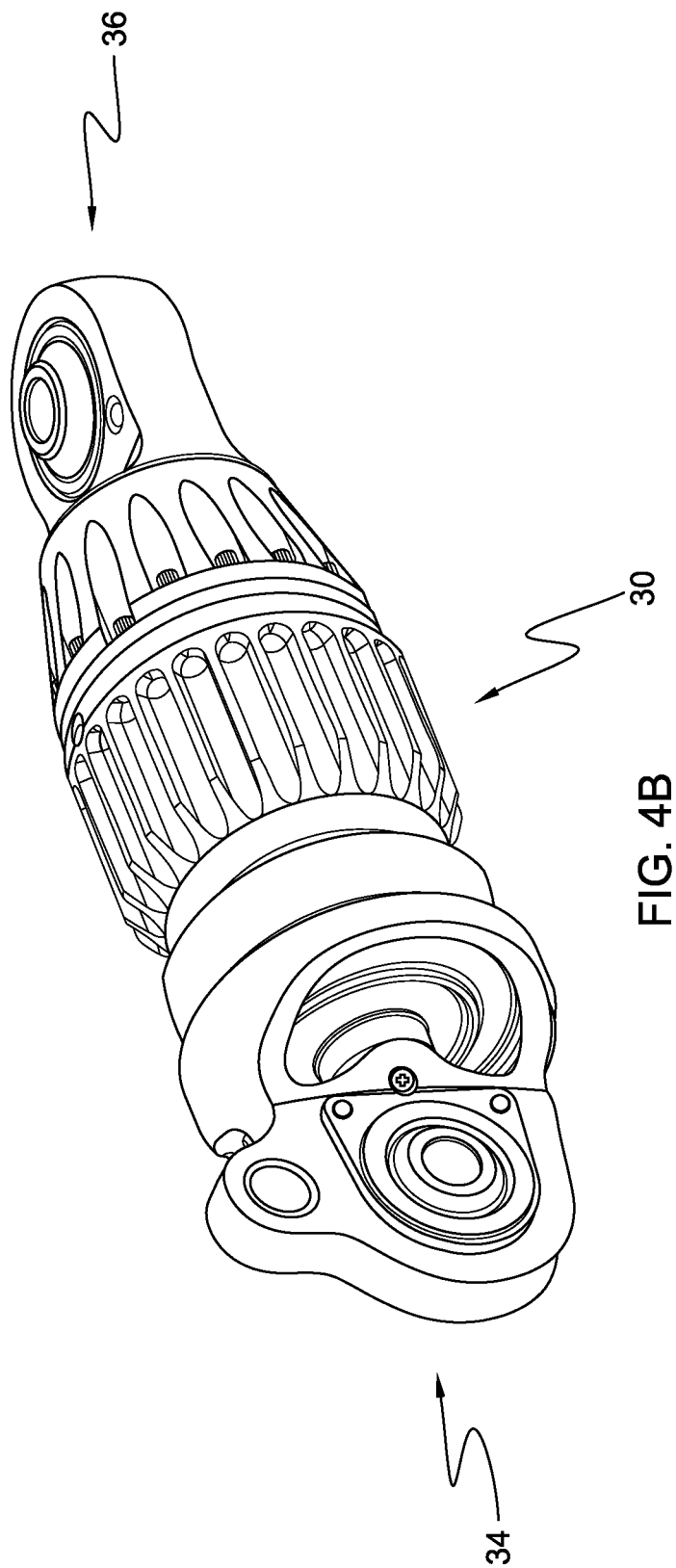
Figure 4C:
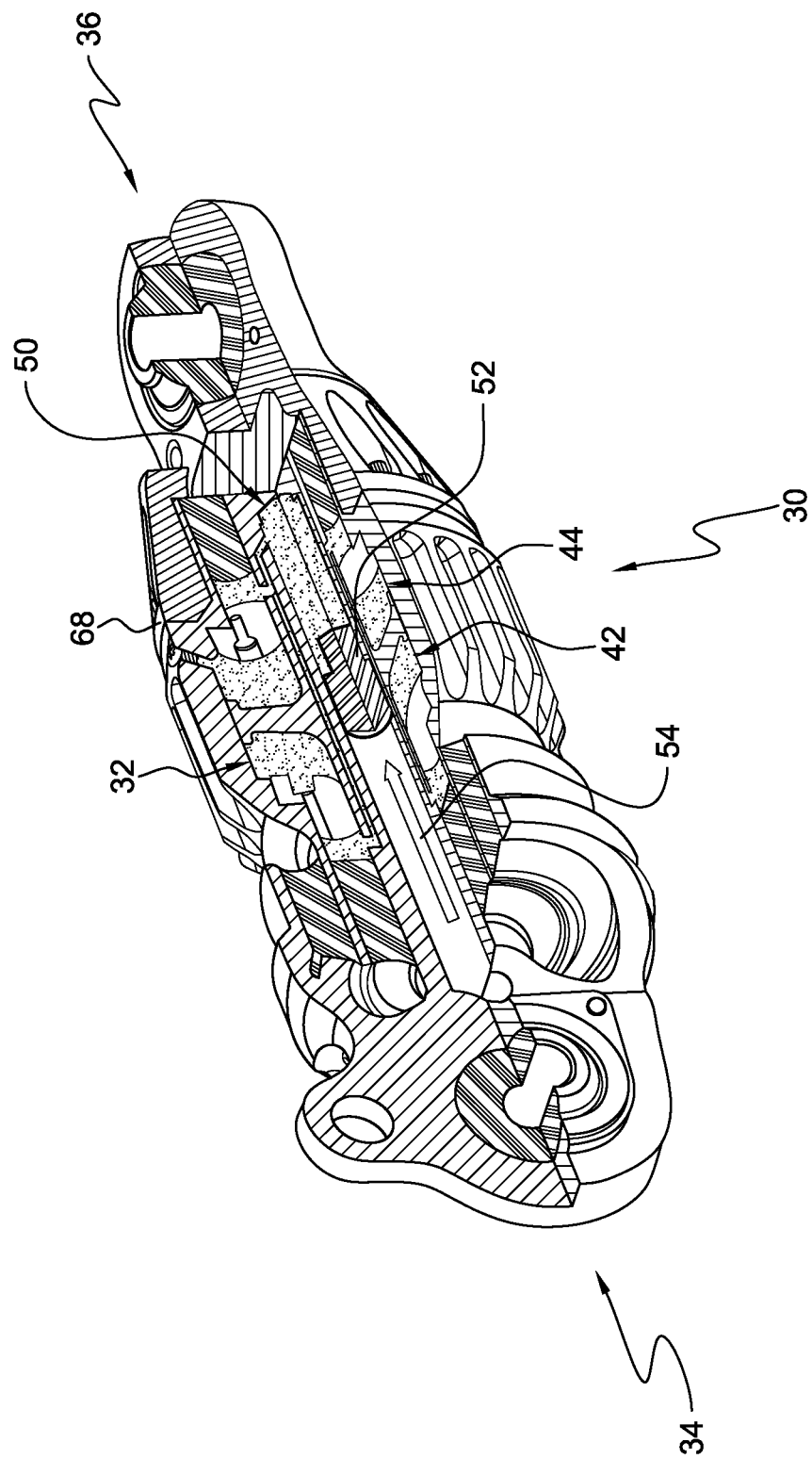
Figure 4D:
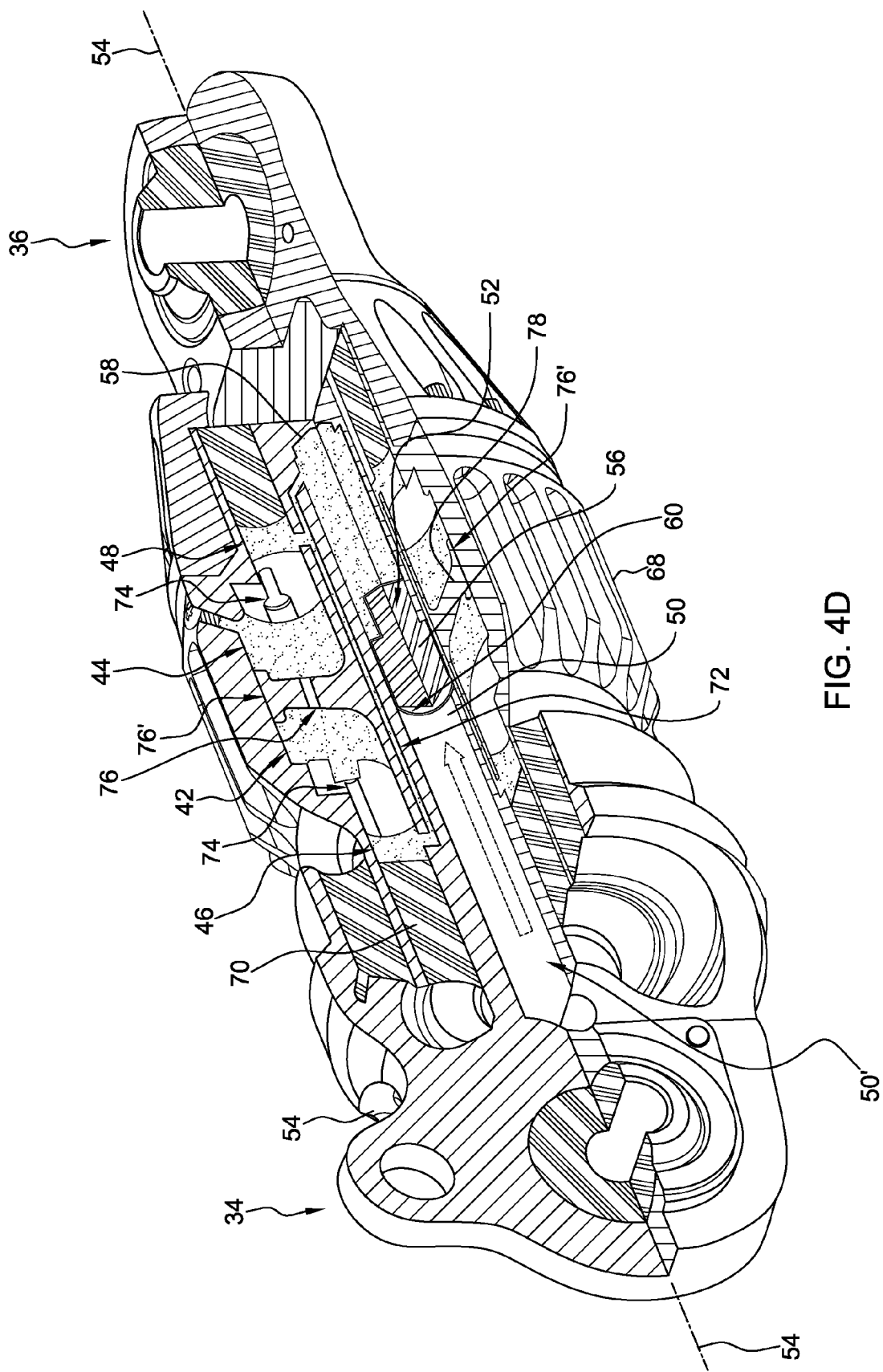
Figure 4E:
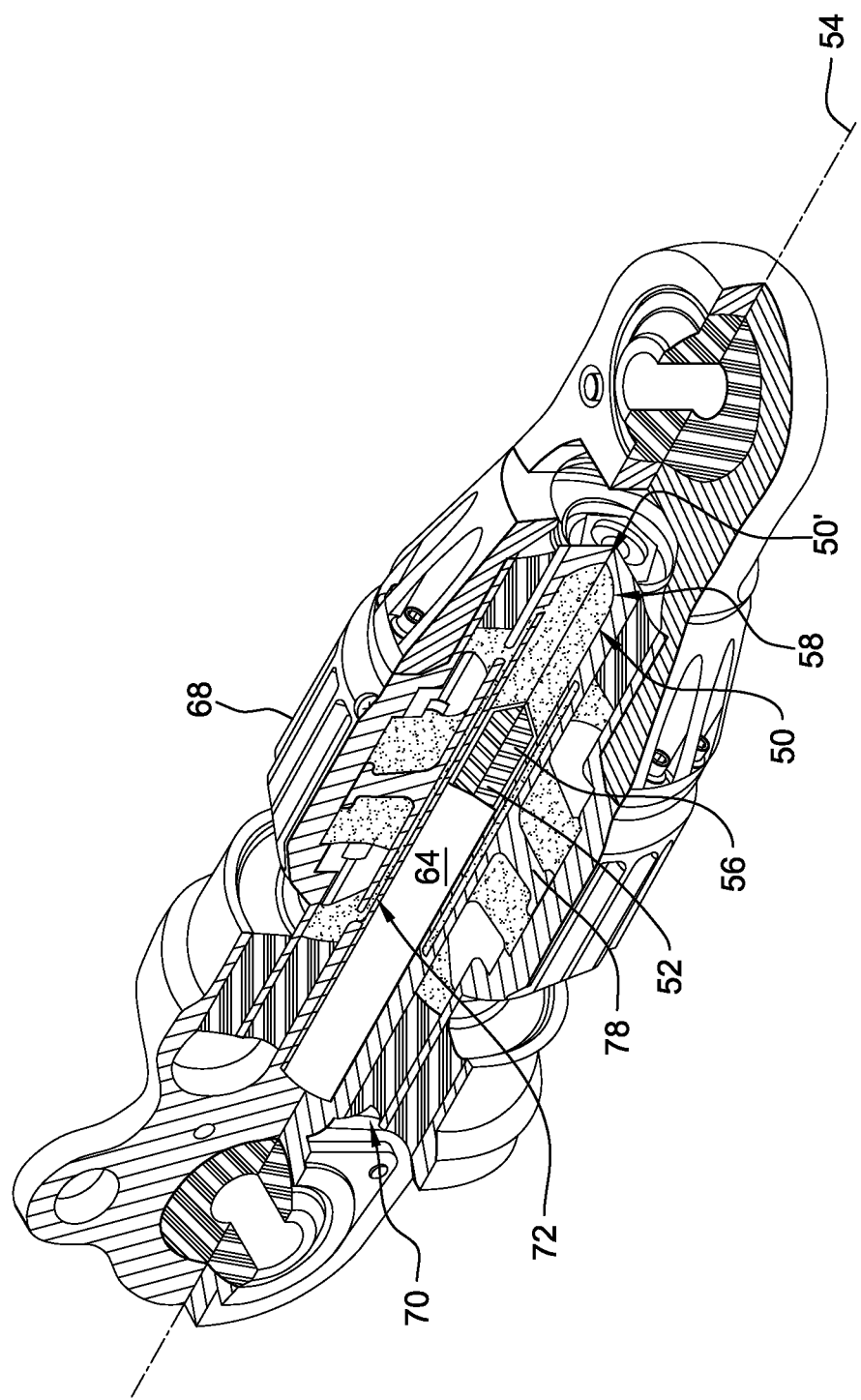
Figure 4F:
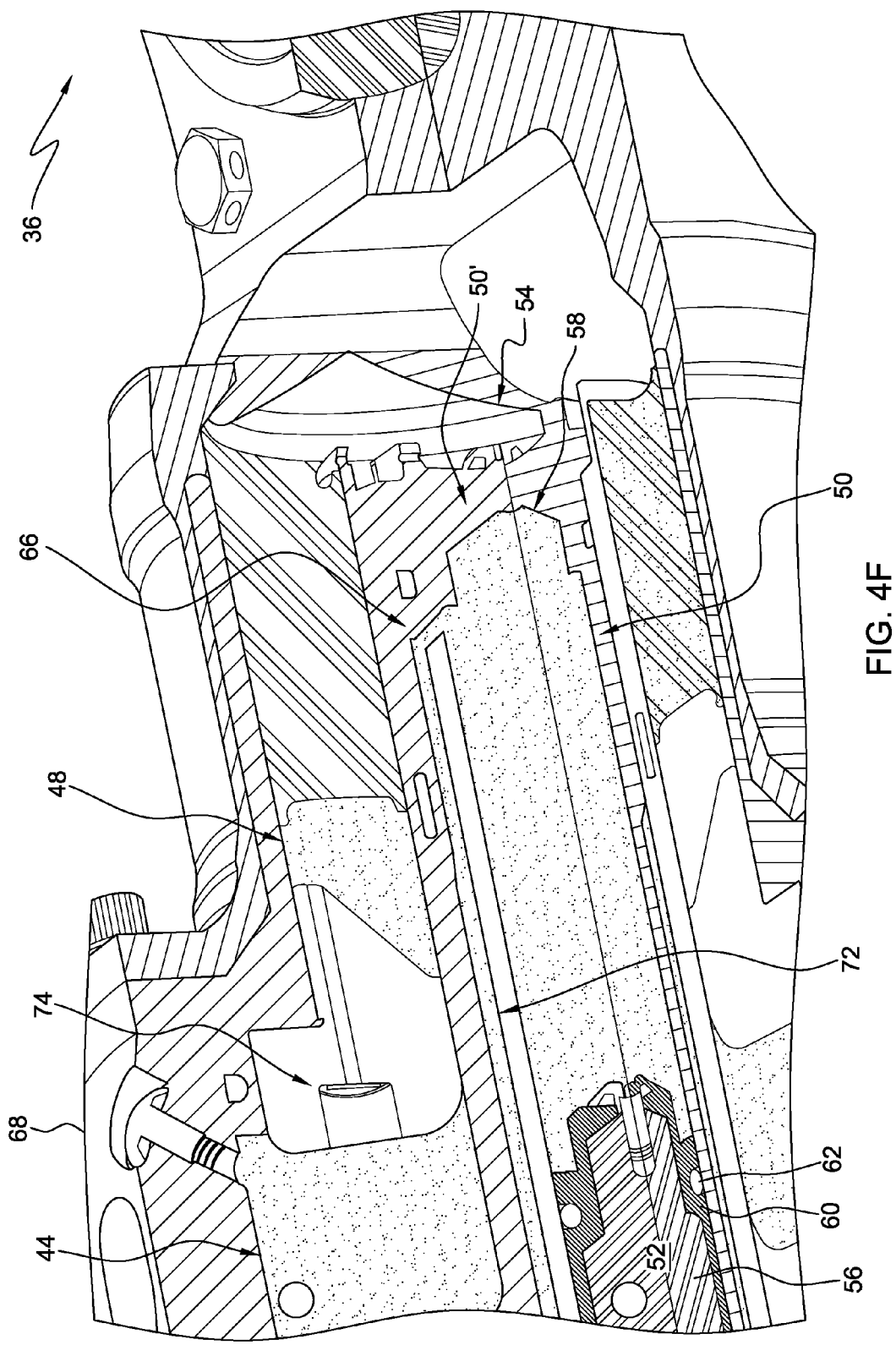
Figure 4G:
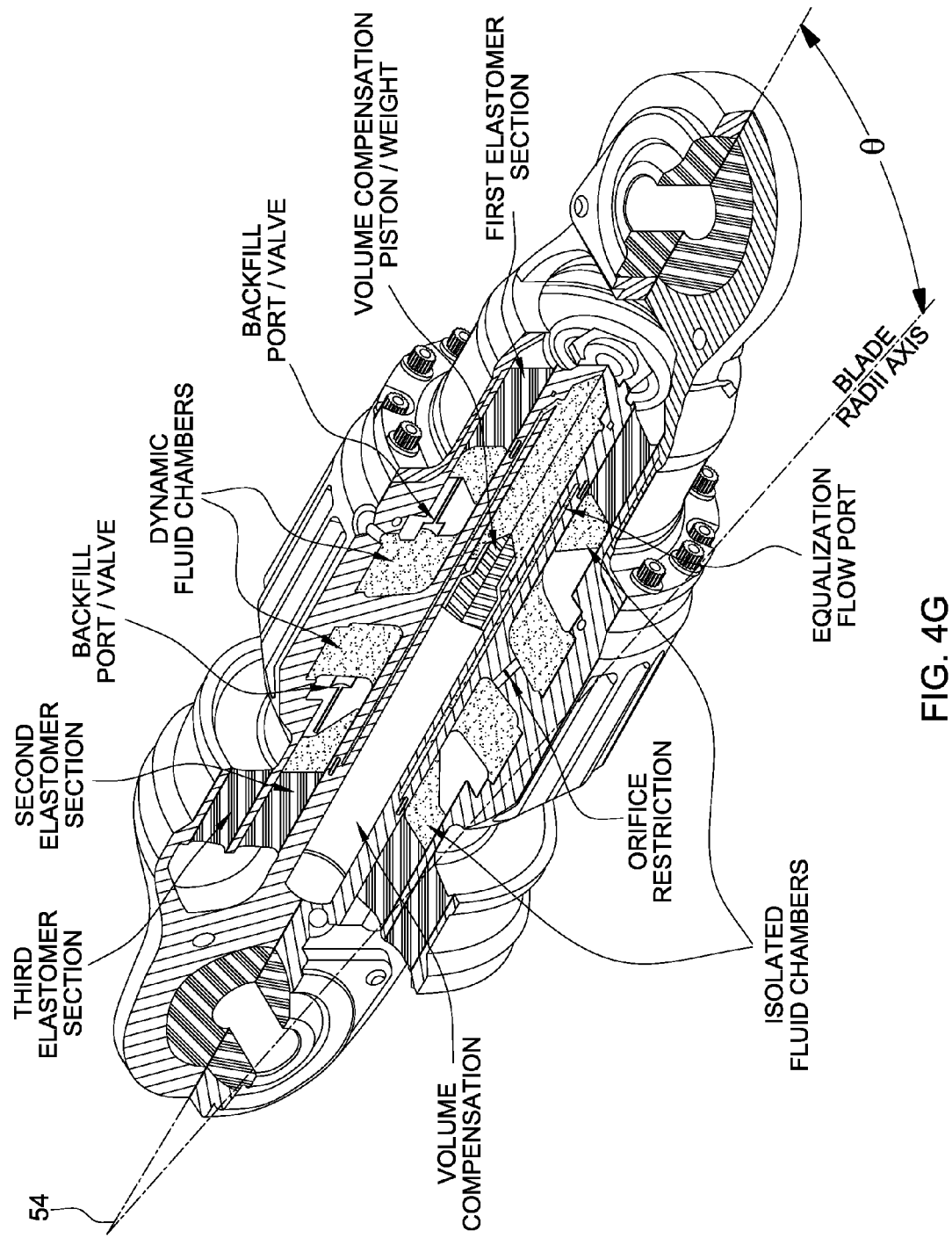

Preferably the volume compensator channel 50 is dynamically isolated from the working chambers 42 and 44, and is connected indirectly through an isolating conduit 66, having substantially narrow cross-section and substantially long length, and connected to an outer fluid elastomeric chamber. The damper is preferably comprised a nonelastomeric housing 68 and at least a first nondynamic elastomer seal 70 (preferably elastomer is bonded, and does not roll or slide or rub or provide a mechanical sliding seal). Preferably the elastomer seal is coupled to the housing with the housing and the at least first nondynamic elastomer seal providing an outer fluid-elastomeric chamber containing the damper fluid for submerging an internal pumping mechanism, the internal pumping mechanism disposed internally within the fluid-elastomeric chamber providing an inboard outer fluid-elastomeric end chamber 46 and outboard outer fluid-elastomeric end chamber 48, the internal pumping mechanism including the at least first working chamber 42 adjacent the inboard outer fluid-elastomeric end chamber 46 and the second working chamber 44 adjacent the outboard outer fluid-elastomeric end chamber 48, and a longitudinally extending connection conduit 72, the longitudinally extending connection conduit 72 connecting the inboard outer fluid-elastomeric end chamber 46 and outboard outer fluid-elastomeric end chamber 48, with the first working damper fluid-filled chamber 42 and the second working damper fluid-filled chamber 44 preferably isolated from the at least first non-dynamic elastomer seal, preferably with fluid backfiller fluid one way flow control check valves 74. The inboard fluid backfiller fluid one way flow control check valves 74 prevents fluid flow from first working chamber 42 into the adjacent inboard outer fluid-elastomeric end chamber 46 but allows fluid flow from the inboard outer fluid-elastomeric end chamber 46 into the first working chamber 42. Preferably the fluid damper 30 includes a nonelastomeric housing 68 with at least a first nondynamic elastomer seal bonded to a housing member. Preferably the fluid damper 30 includes a nonelastomeric housing with at least two inboard concentric layered elastomers (elastomeric sections) bonded to a housing member, preferably centered about the volume compensator channel axis 54. Preferably the fluid damper 30 includes a nonelastomeric housing with an outboard elastomer seal (elastomer) bonded to a housing member, preferably centered about the volume compensator channel axis 54. As shown in FIG. 4D, with inboard end 34 attached to an inboard member such that a relative movement of a distal outboard member moves outboard end 36, the damper is worked with inboard end 34 stationary relative to the moving outboard end 36, with the inboard end of the damper extending through the two inboard concentric layered elastomers with its internal pumping mechanism piston 78 providing the working chambers 42, 44, with the surrounding outer housing moving back and forth working the fluid through fluid orifices 76, 76'. With the fluid backfiller fluid one way flow control check valves 74 fluid is allowed to back fill into the working chambers to ensure they are full of fluid. Additionally the connection conduit axially extends along a length of the damper to allow cross connection of fluid between the inboard and outboard ends of the fluid-elastomeric chamber. When the damper is rotated the compensating mass moves outward and pressurizes the damper fluid, with the damper fluid from the compensator forced out through the isolating conduit 66 into the connecting conduit 72 to apply a fluid pressure to the damper fluid in fluid communication with the chambers 42, 44.

In an embodiment the invention includes a method for controlling a rotary wing aircraft rotating blade. The method includes providing a rotary wing aircraft rotating blade 22 which rotates about a rotation axis 28. The method includes providing a fluid damper 30 with a damper fluid 32 and at least a first working chamber 42 for controlling a motion of the rotating blade. The method includes providing a volume compensator 50' with a volume compensator channel 50 in fluid communication with the damper fluid, the volume compensator channel including the centrifugal force mass member 52 movable along the volume compensating length of the volume compensating channel, and linking the fluid damper and the volume compensator with the rotating blade wherein a rotation about the rotation axis forces the centrifugal force mass member towards an outboard end of the volume compensating channel and pushes damper fluid from the volume compensator channel towards the at least first working chamber. Preferably the rotating blade has a blade axis radii radiating outward and normal from the rotation axis, and the volume compensating length has a volume compensator channel axis substantially aligned with the blade radii axis, preferably with alignment sufficient to advantageously use the centrifugal force effects of rotation about the axis of rotation, preferably with the angle between the volume compensator channel axis and the radii extending normal from the rotation axis (and preferably the blade axis) is less than 45 degrees.

In an embodiment the invention includes a rotating blade damper for a blade rotating about a rotation axis, the blade damper including a fluid damper with a damper fluid for controlling a troublesome blade motion. The fluid damper has the inboard end and the outboard end, with the fluid damper inboard end for attachment to a first inboard member (proximate the rotation axis) and the outboard end for attachment to a second outboard member (distal from the rotation axis), the fluid damper containing a damper fluid volume in at least a first working chamber which is worked by a relative motion between the inboard end and the outboard end to control the troublesome motion, the blade damper including a volume compensator channel in fluid communication with the damper fluid. The volume compensator channel including a centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the at least first working chamber.

The centrifugal force mass member is preferably comprised of a metal core, and is preferably a cylindrical slider with a first inboard larger OD and a second outboard smaller OD, with the second outboard OD for reception in an outboard channel receiver volume compensating length terminating outboard end.

The centrifugal force mass member is preferably comprised of an exterior sliding shell, preferably a polymer, preferably a low friction smooth plastic coating encasing the solid metal core.

As the rotation about the rotation axis forces the centrifugal force mass member towards the outboard end of the volume compensating channel a channel gas fills the inboard void space in the volume compensating channel left behind the moving centrifugal force mass member. Preferably the channel gas is an expanding sealed channel gas sealed within the channel. Preferably the channel gas is a treaded filtered atmospheric channel gas. In an embodiment the treated filtered atmospheric channel gas is filtered from the surrounding ambient atmosphere.

Preferably the volume compensator channel is dynamically isolated from the working chambers. Preferably the volume compensator channel 50 is dynamically isolated from the working chambers 42 and 44, and is connected indirectly through an isolating conduit 66, having substantially narrow cross-section and substantially long length, and connected to an outer fluid elastomeric chamber. The damper is preferably comprised a nonelastomeric housing 68 and at least a first nondynamic elastomer seal 70 (elastomer is bonded, does not roll or slide or rub, is not a mechanical sliding seal). Preferably the elastomer seal is coupled to the housing with the housing and the at least first nondynamic elastomer seal providing an outer fluid-elastomeric chamber containing the damper fluid for submerging an internal pumping mechanism, the internal pumping mechanism disposed internally within the fluid-elastomeric chamber providing an inboard outer fluid-elastomeric end chamber 46 and outboard outer fluid-elastomeric end chamber 48, the internal pumping mechanism including the at least a first working chamber 42 adjacent the inboard outer fluid-elastomeric end chamber 46 and the second working chamber 44 adjacent the outboard outer fluid-elastomeric end chamber 48, and a longitudinally extending connection conduit 72, the longitudinally extending connection conduit 72 connecting the inboard outer fluid-elastomeric end chamber 46 and outboard outer fluid-elastomeric end chamber 48, with the first working damper fluid-filled chamber 42 and the second working damper fluid-filled chamber 44 preferably isolated from the at least first nondynamic elastomer seal, preferably with fluid backfiller fluid one way flow control check valves 74. The inboard fluid backfiller fluid one way flow control check valves 74 prevents fluid flow from first working chamber 42 into the adjacent the inboard outer fluid-elastomeric end chamber 46 but allows fluid flow from the inboard outer fluid-elastomeric end chamber 46 into the first working chamber 42. Preferably the fluid damper 30 includes a nonelastomeric housing 68 with at least a first nondynamic elastomer seal bonded to a housing member. Preferably the fluid damper 30 includes a nonelastomeric housing with at least two inboard concentric layered elastomers (elastomeric sections) bonded to a housing member, preferably centered about the volume compensator channel axis 54. Preferably the fluid damper 30 includes a nonelastomeric housing with an outboard elastomer seal (elastomer) bonded to a housing member, preferably centered about the volume compensator channel axis 54. As shown in FIG. 4D, with inboard end 34 attached to an inboard member such that a relative movement of a distal outboard member moves outboard end 36, the damper is worked with inboard end 34 stationary relative to the moving outboard end 36, with the inboard end of the damper extending through the two inboard concentric layered elastomers with its internal pumping mechanism piston 78 providing the working chambers 42, 44, with the surrounding outer housing moving back and forth working the fluid through fluid orifices 76, 76'. With the fluid backfiller fluid one way flow control check valves 74 fluid is allowed to back fill into the working chambers to ensure they are full of fluid. Additionally, the connecting conduit axially extends along a length of the damper to allow cross connection of fluid between the inboard and outboard ends of the fluid-elastomeric chamber. When the damper is rotated the compensating mass moves outward and pressurizes the damper fluid, with the damper fluid from the compensator forced out through the isolating conduit 66 into the connecting conduit 72 to apply a fluid pressure to the damper fluid in fluid communication with the chambers 42, 44.

In an embodiment the invention includes a method of making a damper. The method includes providing a damper fluid. The method includes providing a housing for containing the damper fluid in at least a first working chamber and at least a second working chamber. The method includes providing a volume compensator with a volume compensator channel in fluid communication with the damper fluid, the volume compensator channel including a centrifugal force mass member movable along a volume compensating length having an inboard end and outboard end, wherein a rotation of the volume compensator with the volume compensating length outboard end outboard of the volume compensating length inboard end forces the centrifugal force mass member towards the outboard end of the volume compensating channel and applies a pressure to the damper fluid.

In an embodiment the invention includes a method of making a rotary wing aircraft rotating blade machine. The method includes providing a rotary wing rotating blade rotor which rotates about an axis of rotation, the rotating blade rotor including a fluid member, the fluid member including a housing containing a working fluid. The method includes providing a volume compensator with a volume compensator channel in fluid communication with the working fluid through fluid conduits eventually with the damper fluid volume in the at least a first working chamber, the volume compensator channel including a centrifugal force mass member movable along a volume compensating length having an inboard end proximate the axis of rotation and an outboard end distal from the axis of rotation, with a volume compensator channel axis, wherein a rotation of the volume compensator with the rotating blade rotor forces the centrifugal force mass member towards the outboard end of the volume compensating channel and applies a pressure to the working fluid.

In an embodiment the invention includes a method of making a rotary wing aircraft machine. The method including providing a rotary wing rotor which rotates about an axis of rotation, the rotary wing rotor including a fluid member, the fluid member including a housing containing a working fluid. The method including providing a volume compensator in fluid communication with the working fluid through fluid conduits eventually with the damper fluid volume in the at least a first working chamber, the volume compensator including a movable centrifugal force mass member, wherein a rotation of the volume compensator with the rotary wing rotor forces the centrifugal force mass member to apply a pressure to the working fluid.

Preferably the damper comprises a main rotor lead-lag damper for a rotary wing aircraft and includes a fluid damping element and elastomeric stiffness elements. The first and second elastomeric stiffness elements are preferably integrally bonded to the inboard and outboard metal housings and the inner structural components forming the fluid enclosure. Preferably a third elastomeric section, which works in conjunction with the fluid damping element and the first and second elastomeric sections, provides additional stiffness and damping. Preferably the fluid chambers formed in the assembly by the first and second elastomer sections, piston, guide bushings and rigid housings are inter-connected by fluid flow passages. Relative motion of the structurally joined inboard and outboard outer housings and the internal structural components, inner bonded components, piston and central compensator bolt, results in displacement of fluid through an orifice restriction. Restricting the fluid flow between the fluid chambers creates fluid flow losses that result in differential dynamic pressures in the fluid chambers. The differential pressure in the fluid chambers acts on the damper piston which provides the damping force. Damping performance is preferably enhanced by restrictive clearances within the damping device. Preferably no mechanical sliding seals are necessary to provide the damping force. Fluid flow around the piston circumference at the outer housing and guide bushing interfaces is preferably controlled by means of highly restrictive fluid flow areas at these locations. The high restrictive fluid flow areas are controlled preferably by applying geometry control to the components. Secondary fluid chambers are preferably formed by the guide bushings which isolate the dynamic pressures from the elastomer sections and control the piston to outer housing location. The isolation is preferably provided by means of the high resistance fluid flow areas at the piston to guide bushing interface. Preferably fluid pressure equalization flow ports, which interconnect the isolated fluid chambers adjacent to the first and second elastomer sections, minimize dynamic pressures acting on the first and second elastomer sections that form the flexible dynamic seals. Preferably no mechanical sliding seals are required or utilized. The volume compensation chamber preferably provides for thermal effects on the fluid and is inter-connected to the fluid chambers. The volume compensation chamber is preferably pressurized to provide a positive pressure within the damper assembly which is hermetically sealed from the outside environment. The pressure is preferably sufficient to maintain at least one atmosphere of internal pressure for all predetermined aircraft operating conditions. Preferably the internal steady pressure within the damper assembly is supplemented by the centrifugal force acting on the compensator piston which is preferably weighted to provide force sufficient enough to pressurize the fluid. The centrifugal force generated overcomes frictional forces acting on the compensator seal and piston and provide an internal pressure sufficient to actuate the fluid chamber backfill valves. The backfill valves are incorporated in the primary fluid chambers to replenish the fluid displaced from the dynamic pressure chambers through the high resistance fluid flow areas at the piston to guide bushing interface during operation. The backfill valves preferably actuate if the pressure in the primary chambers are less than the pressure in the isolated fluid chambers. The amount of fluid replenishment into the primary dynamic fluid chambers is preferably small which results in minimal actuation of the backfill valves. Backfill valves preferably allow the damper to function at low steady operating pressures. Centrifugal forces acting on the damper assembly are preferably reacted by the elastomeric elements and by guide bushings located within the damping element. The guide bushings preferably form part of the damping element and are manufactured from a low friction bearing material. The guide bushings preferably provide location control of the internal components and isolate dynamic pressures from the elastomer sections. Preferably no damping is provided by the guide bushings. The damping fluid preferably lubricates the guide bushings during operation, preferably reducing heat generation and wear. The fluid damper is preferably connected at one end to the blade assembly and on the other end to the rotor hub. Spherical bearings are incorporated preferably in the attachment housings at each end of the damper to accommodate relative motion between the blade assembly, the damper and the hub. The internal geometry of the lead/lag damper is illustrated in FIG. 4.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. A rotary wing system with at least one rotating blade rotating about a rotation axis, said rotary wing system having a troublesome motion when rotating about said rotation axis, said system including:
    a fluid damper with a damper fluid for controlling said troublesome motion, said fluid damper having an inboard end and an outboard end, said fluid damper inboard end attached to a first rotary wing system inboard member proximate said rotation axis and said outboard end attached to a second rotary wing system outboard member distal from said rotation axis;
    said fluid damper containing a damper fluid volume in at least a first working chamber which is worked by a relative motion between said first rotary wing system inboard member and said second rotary wing system outboard member to control said troublesome motion;
    said fluid damper including a volume compensator channel in fluid communication with said damper fluid, said volume compensator channel including a centrifugal force mass member movable along a volume compensating length of said volume compensating channel, said centrifugal force mass member being comprised of an exterior sliding shell; and
    wherein a rotation about said rotation axis forces said centrifugal force mass member towards an outboard end of said volume compensating channel and pushes damper fluid from said volume compensator channel towards said at least first working chamber.

2. A system as claimed in claim 1 wherein said centrifugal force mass member is comprised of a solid metal core.

3. A system as claimed in claim 1 wherein as said rotation about said rotation axis forces said centrifugal force mass member towards said outboard end of said volume compensating channel a channel gas fills the inboard void space in said volume compensating channel left behind said moving centrifugal force mass member.

4. A system as claimed in claim 3 wherein said channel gas is an expanding sealed channel gas.

5. A system as claimed in claim 3 wherein said channel gas is a filtered atmospheric channel gas.

6. A system as claimed in claim 1 wherein said volume compensator channel is dynamically isolated from said at least a first working chamber.

7. A system as claimed in claim 1 wherein said fluid damper includes a nonelastomeric housing with at least a first elastomer seal bonded to a housing member.

8. A system as claimed in claim 1 wherein said fluid damper includes a nonelastomeric housing with at least two concentric layered elastomer seals bonded to a housing member.

9. A system as claimed in claim 1 wherein said fluid damper includes a nonelastomeric housing with an outboard elastomer seal bonded to a housing member.

10. A rotating blade damper for a blade rotating about a rotation axis, said blade damper including
    a fluid damper with a damper fluid for controlling a troublesome blade motion,
    said fluid damper having an inboard end and an outboard end, said fluid damper inboard end for attachment to a first inboard member and said outboard end for attachment to a second outboard member,
    said fluid damper containing a damper fluid volume in at least a first working chamber which is worked by a relative motion between said inboard end and said outboard end to control said troublesome motion,
    said blade damper including a volume compensator channel in fluid communication with said damper fluid, said volume compensator channel including
    a centrifugal force mass member movable along a volume compensating length of said volume compensating channel, said centrifugal force mass member being comprised of an exterior sliding shell,
    wherein a rotation about said rotation axis forces said centrifugal force mass member towards an outboard end of said volume compensating channel and pushes damper fluid from said volume compensator channel towards said at least first working chamber.

11. A damper as claimed in claim 10 wherein said centrifugal force mass member is comprised of a metal core.

12. A damper as claimed in claim 10 wherein as said rotation about said rotation axis forces said centrifugal force mass member towards said outboard end of said volume compensating channel a channel gas fills the inboard void space in said volume compensating channel left behind said moving centrifugal force mass member.

13. A damper as claimed in claim 12 wherein said channel gas is an expanding sealed channel gas.

14. A damper as claimed in claim 12 wherein said channel gas is a filtered atmospheric channel gas.

15. A damper as claimed in claim 12 wherein said volume compensator channel is dynamically isolated from said at least a first working chamber.

16. A damper as claimed in claim 10 wherein said fluid damper includes a nonelastomeric housing with at least a first elastomer seal bonded to a housing member.

17. A damper as claimed in claim 10 wherein said fluid damper includes a nonelastomeric housing with at least two concentric layered elastomer seals bonded to a housing member.

18. A damper as claimed in claim 10 wherein said fluid damper includes a nonelastomeric housing with an outboard elastomer seal bonded to a housing member.

19. A method of making a damper, said method including:
providing a damper fluid,
providing a housing for containing said damper fluid in at least a first working chamber and at least a second working chamber,
providing a volume compensator with a volume compensator channel in fluid communication with said damper fluid, said volume compensator channel including a centrifugal force mass member having an exterior sliding shell and being movable along a volume compensating length having an inboard end and an outboard end, wherein a rotation of said volume compensator with said volume compensating length outboard end outboard of said volume compensating length inboard end forces said centrifugal force mass member towards said outboard end of said volume compensating channel and applies a pressure to said damper fluid.

20. A method of damping using centrifugal force, said method comprising the steps of:
providing a damper, said damper including:
a housing;
a first end having a first mounting point;
a second end having a second mounting point, said second end being oppositely positioned from said first end;
a fluid damper positioned within said housing and positioned between said first end and said second end, said fluid damper having a fluid therein;
at least two fluid reservoirs contained within said fluid damper;
a channel providing fluid communication between said fluid;
a compensator piston positioned within said channel, said being movable within said channel in response to a centrifugal force;
exerting a centrifugal force upon said compensator piston;
displacing said compensator piston within said channel and moving said compensator piston toward one of said fluid reservoir;
pressurizing said fluid in said reservoir by increasing a pressure upon said fluid as a result of said compensator piston moving toward said fluid reservoir; and
increasing a resistance to said centrifugal force as said pressure increases.

* * * * *